Figure 1:
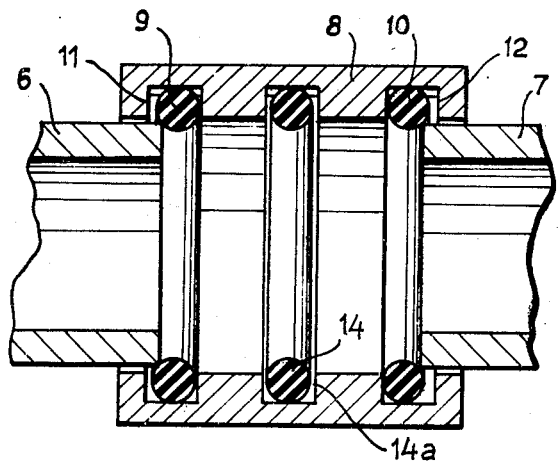

Nov. 24, 1959  A. MAGNANI  2,914,347
SLEEVE JOINT WITH RESILIENT SPACING MEANS
Filed May 18, 1954

United States Patent Office 2,914,347
Patented Nov. 24, 1959

2,914,347

SLEEVE JOINT WITH RESILIENT SPACING MEANS

Alessandro Magnani, Broni, Italy, assignor to Etablissement pour Materiaux de Construction, Vaduz, Germany, and F. L. Smidth & Co., A/S, Copenhagen-Valby, Liechtenstein, Denmark Application May 18, 1954, Serial No. 430,637

Claims priority, application Italy May 29, 1953

1 Claim. (Cl. 285—349)

A great variety of joints for pipes conveying pressure fluids have been proposed, said joints being intended to meet the properties of the pipe material and operating conditions of the line.

This invention relates more particularly to socket and sleeve joints which are required to be resilient, that is, to allow for setting and deflections of the line, and simultaneously to afford a tight seal. The latter condition is mostly met by adopting packings of rubber or similar material.

A large number of pipe joints have been manufactured in which the packings of resilient material are pressed against the outer wall of the pipes to be connected by means of flanges and screws. These constructions are, however, elaborate and expensive.

It is further known to employ U-shaped packings seated in suitable recesses. This type of packing affords a satisfactory seal only for a given direction of pressure. It does not suit pressure water pipes because, when emptying the line, an underpressure is easily set up within the latter and risk of contamination ensues. A further drawback of the U-packing is its extensive surface and ensuing greater risk of deterioration of the material of which it is made.

In other known cases, the packings of substantially circular section are forced between the inner surface of the socket or sleeve by causing the latter to slide axially on the pipe, causing the packing to roll to its ultimate position in which it is retained by suitable projections or castings or lead, cement or other material. As the rubber ring rolls, it is easily liable to take an incorrect position which may objectionably affect its sealing function.

The main object of this invention is to remove the abovementioned drawbacks and facilitate and improve assembly of the joint.

In a particular manner this invention relates to a joint for connecting coaxial cylindrical members, more particularly pipes, of the type in which a resilient packing of substantially circular section seals the joint, this packing being pressed between the outer surface of the inner member by effect of the relative axial movement of the members to be connected, wherein the packing is accommodated in a seating shaped to prevent the packing from undergoing during the said relative movement substantial variations in position with respect to the outer member, and to cause it to behave in a similar manner in respect of sealing both under outwardly and inwardly directed pressures in the pipe.

The joint according to this invention is suitable for connecting pipes having socket-shaped as well as cylindrical ends.

Further features of this invention will be understood from the appended specification in which reference is made to the accompanying drawing showing some embodiments thereof by way of example.

Figure 2:
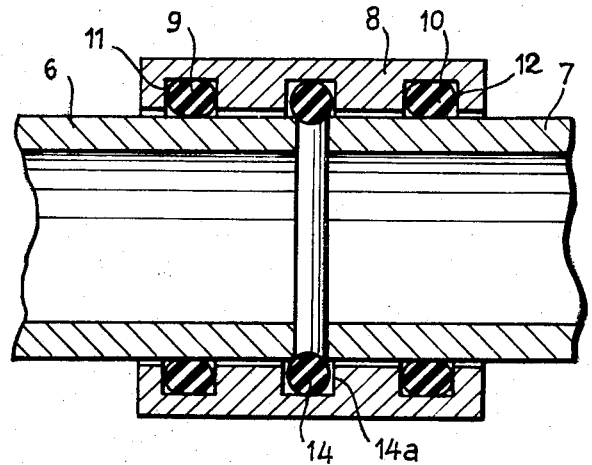

Figure 1 shows a socket joint for connecting pipes with cylindrical ends in the position ready for assembly, Figure 2 shows the joint according to Figure 1 in an assembled condition.

Referring to Figures 1 and 2, 6 denotes the cylindrical end of a pipe and 7 shows the socket end of the other pipe. A coupling sleeve 8 is provided to receive the respective cylindrical pipe ends 6 and 7.

Grooves 11, 12 and 14a are cut within the sleeve and seats respectively annular packings 9, 10 and 14 of rubber or similar material of circular shaped section.

Assembly is carried out by forcing the ends of pipes 6 and 7 into the sleeve 8 thereby crushing the rubber packings as indicated in Figure 2. During this assembling step the rubber rings 9, 10 and 14 are kept against substantial displacement with respect to the sleeve 8 by the provision of the seatings 11, 12 and 14a in the form of circular grooves, of which the radial walls retain the rubber rings, thereby sealing the joint both under inwardly and outwardly directed pressures within the pipe.

In order to accurately center the sleeve with respect to the two pipes, the sleeve is centrally provided with a projection formed by rubber ring 14 against which the ends of the two coupled pipes fit. As seen in Figs. 1 and 2, the rubber ring 14 is identical with and of the same size as the packing rings 9 and 10.

It will be understood that, the principle of this invention being left unaltered, the constructional details may be largely varied with respect to the examples shown and described without departing from the scope of the invention.

What I claim is:

In a pipe connection, in combination with two pipes of equal outer diameters, an outer sleeve-like member having an inner diameter greater than the outer diameter of each of said pipes, three equal packings of resilient material, each having the form of an O-ring, the inner diameter of which is smaller than the outer diameter of said pipes to be connected, a U-shaped central groove of rectangular cross section cut in the inner periphery of said sleeve-like member for loosely receiving one of said packings, said groove lying in the middle cross plane of said member, and two lateral U-shaped grooves of rectangular cross-section cut in the inner periphery of said member situated on opposed sides of said central groove for loosely receiving the two other packings, said two other packings having a greater initial radial thickness than the distance between the radially outer wall of the grooves and the radially opposite portion of the outer circumference of said pipes, the end portions of said pipes entering said sleeve-like member and engaging with said two other packings being of constant outside diameter, whereby upon assembly of the connection the packing in said central groove abuts with the lower portions of its opposite flanks the end portions of said pipes and forms a resilient spacing member between said end portions of said pipes, capable of strong deformation in the axial direction of the joint, and said two other packings form a seal between said sleeve-like member and said pipes.

(References on following page)

References Cited in the file of this patent

UNITED STATES PATENTS

| | | |
|---|---|---|
| Re. 23,120 | Earle | June 14, 1949 |
| 2,013,660 | Lauer | Sept. 10, 1935 |
| 2,040,155 | Shoemaker | May 12, 1936 |
| 2,105,747 | Martin | Jan. 18, 1938 |
| 2,146,641 | McWane | Feb. 7, 1939 |
| 2,272,115 | Halkyard | Feb. 3, 1942 |
| 2,438,529 | Woodling | Mar. 30, 1948 |
| 2,738,992 | Heiser | Mar. 20, 1956 |

FOREIGN PATENTS

| | | |
|---|---|---|
| 526,828 | Germany | June 14, 1931 |
| 405,717 | Great Britain | Feb. 15, 1934 |
| 488,981 | Great Britain | July 18, 1938 |
| 525,153 | Great Britain | Aug. 22, 1940 |
| 542,208 | Great Britain | Dec. 31, 1941 |
| 663,255 | Great Britain | Dec. 19, 1951 |